US008659702B2

(12) United States Patent
Kamise et al.

(10) Patent No.: US 8,659,702 B2
(45) Date of Patent: Feb. 25, 2014

(54) IMAGE DISPLAYING APPARATUS

(75) Inventors: Shigero Kamise, Kumagaya (JP);
Tatsuro Imura, Fukaya (JP); Takuya Kontani, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 339 days.

(21) Appl. No.: 13/041,051

(22) Filed: Mar. 4, 2011

(65) Prior Publication Data

US 2012/0026399 A1    Feb. 2, 2012

(30) Foreign Application Priority Data

Jul. 27, 2010   (JP) ................................. 2010-168524

(51) Int. Cl.
| H04N 5/50 | (2006.01) |
| H04N 5/44 | (2011.01) |
| H04N 5/64 | (2006.01) |
| G06F 3/00 | (2006.01) |
| G06F 13/00 | (2006.01) |
| H04N 5/445 | (2011.01) |

(52) U.S. Cl.
USPC ............. 348/569; 348/734; 348/836; 725/37; 715/740

(58) Field of Classification Search
None
See application file for complete search history.

(56) References Cited

U.S. PATENT DOCUMENTS

| 2004/0268391 | A1* | 12/2004 | Clercq et al. ..................... 725/37 |
| 2005/0216843 | A1* | 9/2005 | Masters et al. ................ 715/740 |
| 2006/0203136 | A1* | 9/2006 | Testin et al. .................... 348/836 |
| 2009/0261984 | A1 | 10/2009 | Sugimoto |
| 2011/0164189 | A1* | 7/2011 | Asayama et al. ............. 348/734 |

FOREIGN PATENT DOCUMENTS

| JP | 2-86276 | 7/1990 |
| JP | 4-117735 | 4/1992 |
| JP | 9-093056 | 4/1997 |
| JP | 9-247257 | 9/1997 |
| JP | 2003-274310 | 9/2003 |
| JP | 2006-014056 | 1/2006 |
| JP | 2007-251418 | 9/2007 |
| JP | 2008-236369 | 10/2008 |
| JP | 2009-055355 | 3/2009 |
| JP | 2009-070801 | 4/2009 |
| JP | 2010-135570 | 6/2010 |
| WO | 2009-025102 | 2/2009 |
| WO | 2010-029683 | 3/2010 |

OTHER PUBLICATIONS

European Patent Application No. 11156925.7-2202, European Search Report, mailed Oct. 26, 2011.
Japanese Patent Application No. 2010-168524, Notice of Reasons for Rejection, mailed Jun. 7, 2011, (with English Translation).

* cited by examiner

*Primary Examiner* — Jefferey Harold
*Assistant Examiner* — Sean Haiem
(74) *Attorney, Agent, or Firm* — Blakely, Sokoloff, Taylor & Zafman LLP

(57) ABSTRACT

According to one embodiment, an image displaying apparatus includes a plurality of keys provided for respective items to operate the image displaying apparatus, and a first light source configured to illuminate the plurality of keys, wherein the image displaying apparatus turns on the first light source when one of the plurality of keys is operated without making the key operation valid, turns off the first light source when one of the plurality of keys is operated in a preset period after a preceding key operation is performed and makes the key operation valid.

4 Claims, 10 Drawing Sheets

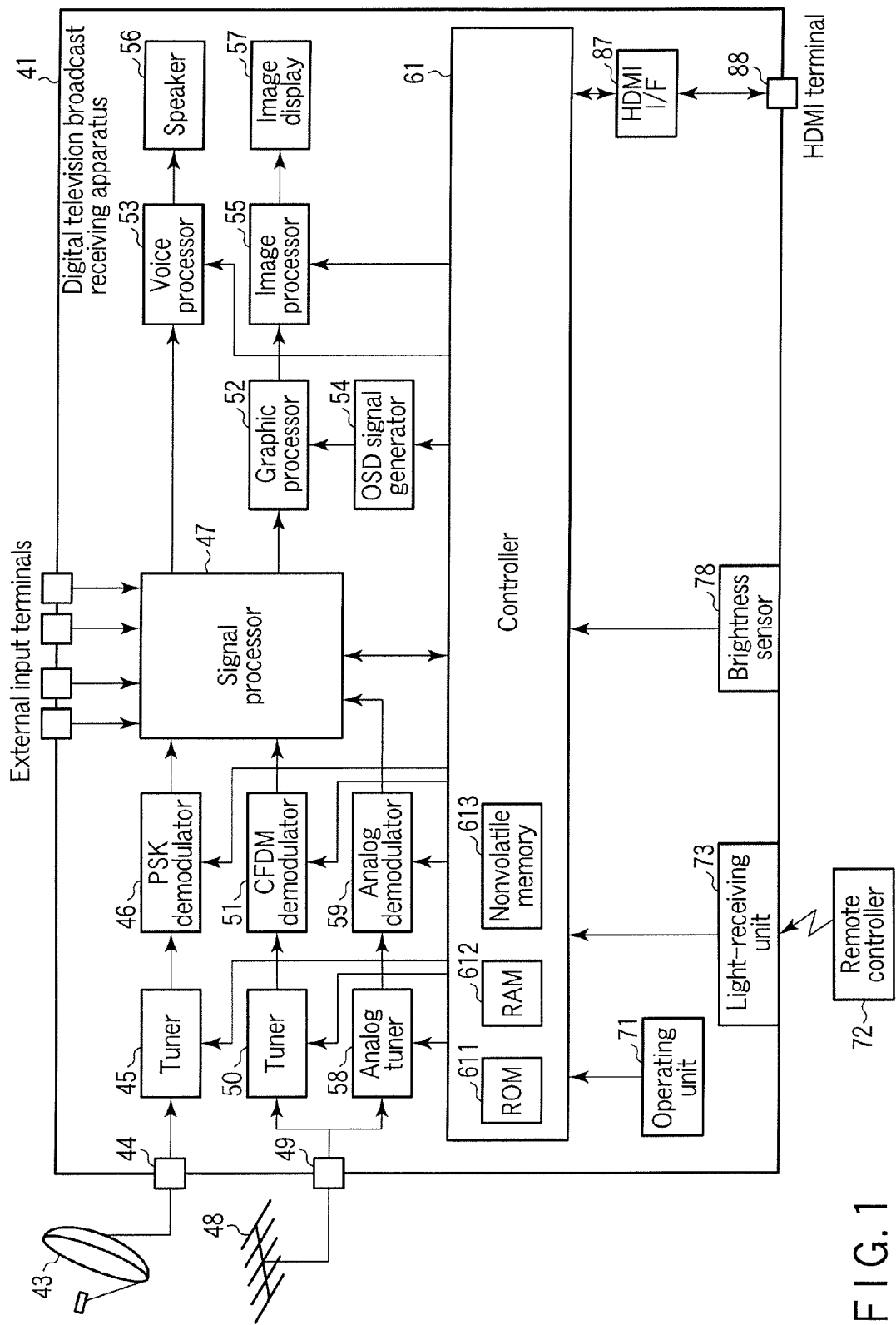
F I G. 1

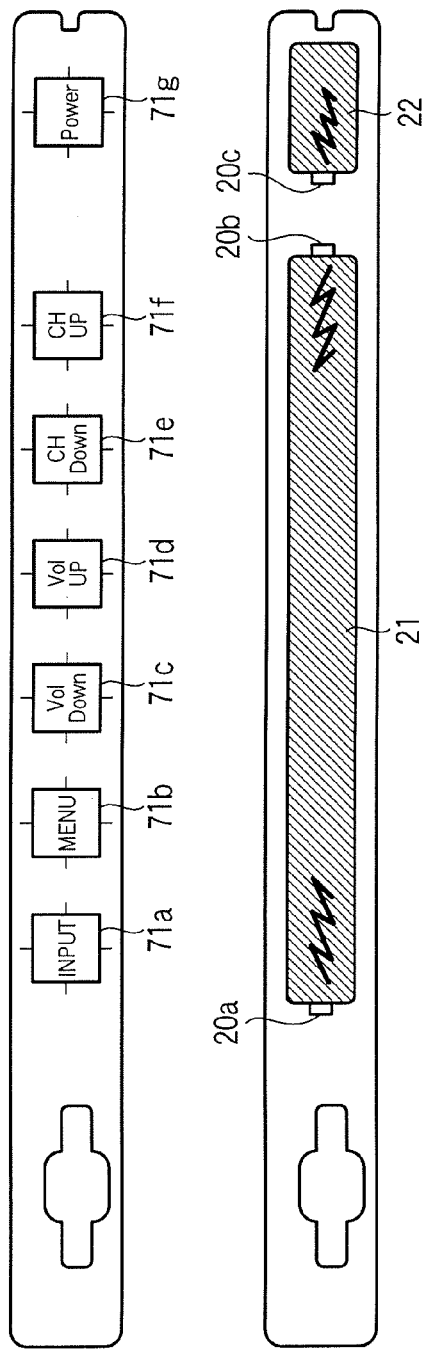
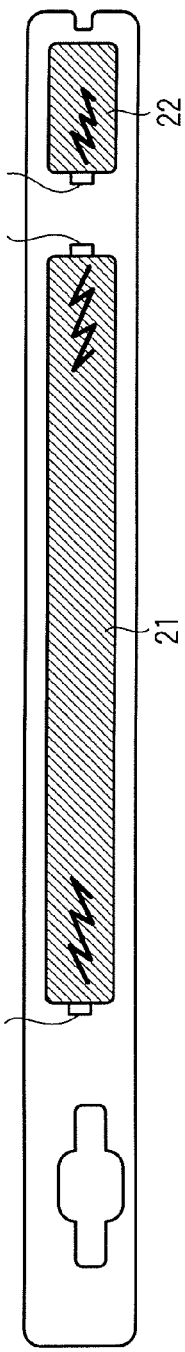
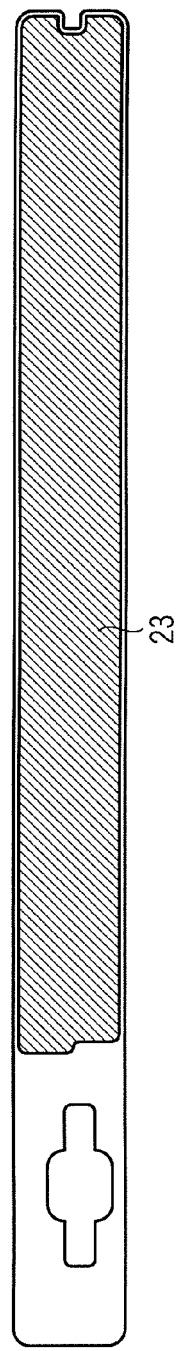
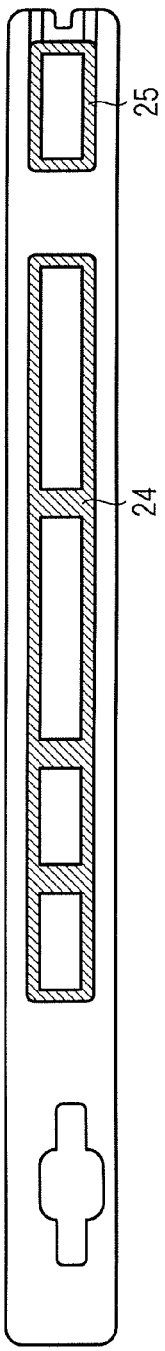
F I G. 4A    F I G. 4B    F I G. 4C    F I G. 4D

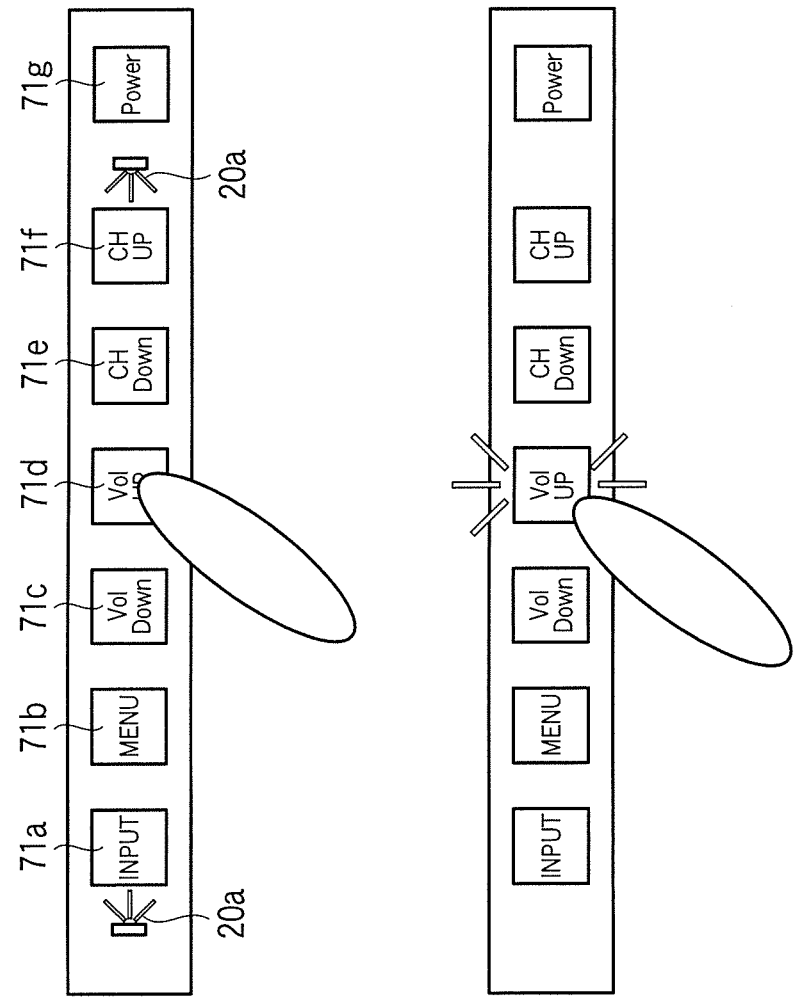

IMAGE DISPLAYING APPARATUS

CROSS-REFERENCE TO RELATED APPLICATIONS

This application is based upon and claims the benefit of priority from Japanese Patent Application No. 2010-168524, filed Jul. 27, 2010; the entire contents of which are incorporated herein by reference.

FIELD

Embodiments described herein relate generally to an image displaying apparatus including a lighting key module.

BACKGROUND

In a digital television broadcast receiving apparatus that is an image displaying apparatus, a display function of on-screen display (OSD) of an image received by an antenna and having an image such as guidance related to the above image superimposed thereon is provided. In the OSD display, for example, volume display used when volume is adjusted, channel number display used when a receiving channel is switched and the like are provided.

If the OSD display is made each time the above operation is performed, there occurs a problem that information or image scene that is desired to be viewed on the screen may be concealed. Therefore, the technique for providing two modes including a normal display mode and OSD display cut mode as an image display mode for on-screen display is disclosed (for example, see Jpn. Pat. Appln. KOKAI Publication No. 2007-251418).

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a diagram showing a main signal processing system of a digital television broadcast receiving apparatus of an exemplary image displaying apparatus of an embodiment.

FIG. 4A, FIG. 4B, FIG. 4C, FIG. 4D are views each showing the configuration of an operating unit of an exemplary image displaying apparatus of the embodiment.

FIG. 5A, FIG. 5B are views for illustrating the operation of keys of a first group of an exemplary image displaying apparatus of the embodiment.

FIG. 10A, FIG. 10B are views for illustrating a volume display method when OSD display of an exemplary image displaying apparatus of the embodiment is ON.

DETAILED DESCRIPTION

Figure 2:
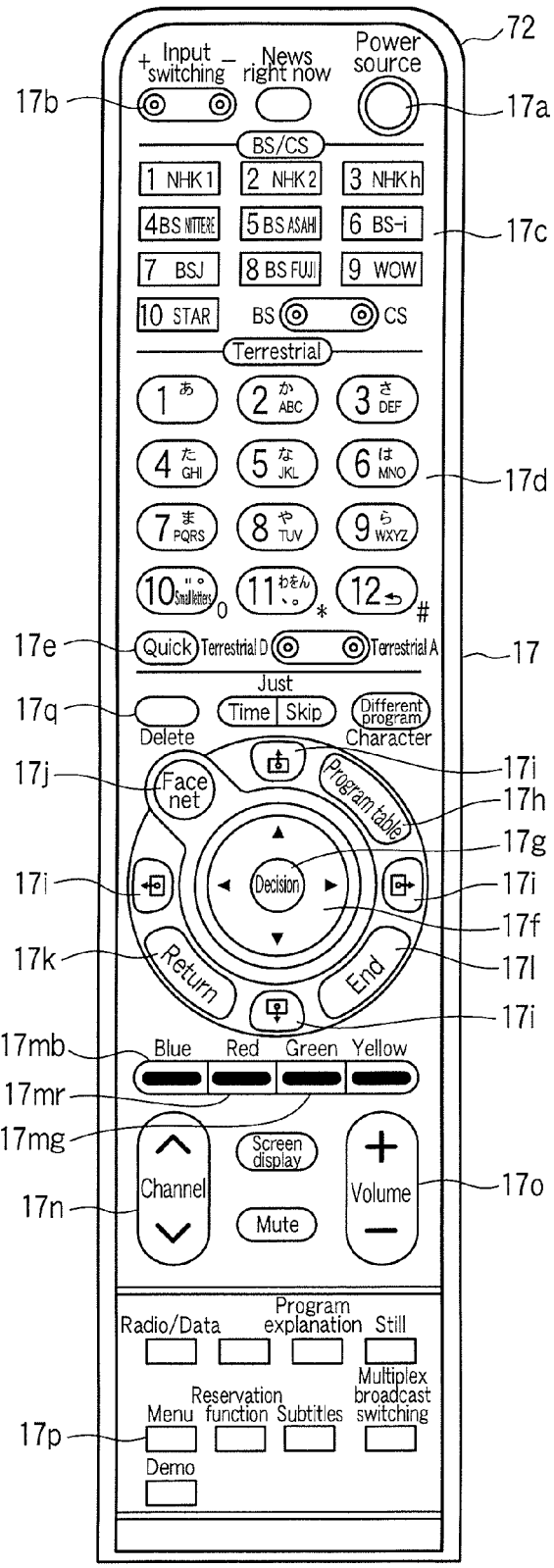
FIG. 2 is a view showing the outer appearance of a remote controller of an exemplary image displaying apparatus of the embodiment.

Various embodiments will be described hereinafter with reference to the accompanying drawings.

In general, according to one embodiment, an image displaying apparatus includes a plurality of keys provided for respective items to operate the image displaying apparatus, and a first light source configured to illuminate the plurality of keys, the image displaying apparatus turns on the first light source when one of the plurality of keys is operated without making the key operation valid, puts out the first light source when one of the plurality of keys is operated in a preset period after a preceding key operation is performed and makes the key operation valid.

First Embodiment

FIG. 1 is a diagram showing a main signal processing system of a digital television broadcast receiving apparatus that is an image displaying apparatus of an embodiment. A satellite digital television broadcasting signal received by a BS/CS digital broadcast receiving antenna 43 is supplied to a satellite digital broadcasting tuner 45 via an input terminal 44 and thus a broadcasting signal of a desired channel is selected.

The broadcasting signal selected by the tuner 45 is supplied to a phase shift keying (PSK) demodulator 46, demodulated to a digital image signal and audio signal and then output to a signal processor 47.

Further, a terrestrial digital television broadcast signal received by a terrestrial digital broadcast receiving antenna 48 is supplied to a terrestrial digital broadcasting tuner 50 via an input terminal 49 and thus a broadcast signal of a desired channel is selected.

The broadcast signal selected by the tuner 50 is supplied to an orthogonal frequency division multiplexing (OFDM) demodulator 51, demodulated to a digital image signal and audio signal and then output to the signal processor 47.

Further, an analog tuner 58 that receives a terrestrial analog signal is provided. A signal received by the analog tuner 58 is demodulated by means of an analog demodulator 59 and output to the signal processor 47.

The signal processor 47 selectively subjects the digital image signal and audio signal supplied from the PSK demodulator 46, the digital image signal and audio signal supplied from the OFDM demodulator 51, the image signal and audio signal supplied from the analog demodulator 59 and an image signal and audio signal from line input terminals to preset digital processes and outputs the results to a graphic processor 52 and audio processor 53.

The graphic processor 52 has a function of superimposing an OSD signal generated by an on-screen display (OSD)

signal generator 54 on the digital image signal supplied from the signal processor 47 and outputting the result. Further, the graphic processor 52 can selectively output an output image signal of the signal processor 47 and an output OSD signal of the OSD signal generator 54, multiplex the above outputs or combine the above outputs to configure a half portion of the screen and output the result of combination.

A digital image signal output from the graphic processor 52 is supplied to an image processor 55. The image processor 55 converts an input digital image signal to an analog image signal of a format that can be displayed on an image display 57 and outputs the same to the image display 57 to display the image thereon.

The audio processor 53 converts an input digital audio signal to an analog audio signal of a format that can be played back by a speaker 56 and outputs the same to the speaker 56 to play back the audio.

In this case, all of the operations of a digital television broadcast receiving apparatus 41 including the above various receiving operations are generally controlled by a controller 61.

The controller 61 contains a central processing unit (CPU) and the like. When receiving operation information from an operating unit 71 or when receiving operation information supplied from a remote controller 72 and output from a light-receiving unit 73, the controller 61 generally controls the respective portions to reflect the operation contents on the apparatus. The operating unit 71 is a touch type key module arranged on the front surface of a display panel 90 of the digital television broadcast receiving apparatus 41.

The controller 61 mainly includes a read-only memory (ROM) 611 that stores a control program executed by the CPU, a random access memory (RAM) 612 that provides a work area for the CPU and a nonvolatile memory 613 that stores various setting information and control information and the like.

The controller 61 is connected to a brightness sensor 78. Thus, the controller 61 can acquire surrounding brightness information and automatically adjust the brightness of the screen, for example.

Further, the controller 61 can transfer information with respective devices connected to a High-Definition Multimedia Interface (HDMI) terminal 88 via an HDMI interface 87 that conforms to the HDMI standard.

FIG. 2 is a view showing the outer appearance of the remote controller 72 used in the image displaying apparatus of this embodiment.

On the remote controller 72, a power source key 17a, input switching key 17b, satellite digital broadcasting channel direct selection key 17c, terrestrial broadcasting channel direct selection key 17d, quick key 17e, cursor key 17f, decision key 17g, program table key 17h, page switching keys 17i, face net (navigation) key 17j, return key 17k, end key 17l, blue, red, green color keys 17mb, 17mr, 17mg, channel up/down key 17n, volume adjustment key 17o, menu key 17p and the like are provided.

Figure 3:
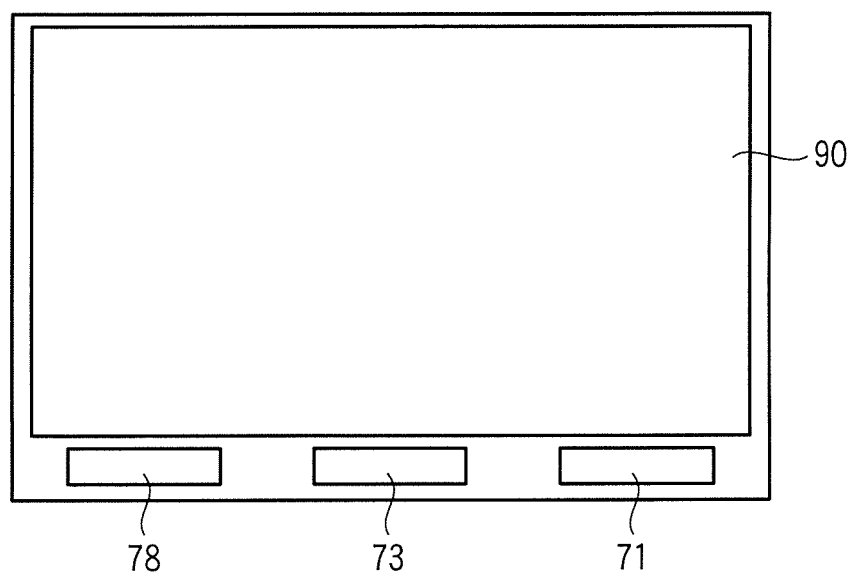
FIG. 3 is a view showing the outer appearance of a display panel of an exemplary image displaying apparatus of the embodiment.

FIG. 3 is a view showing the outer appearance of a display panel 90 of the image displaying apparatus of this embodiment.

The operating unit 71, light-receiving unit 73 and brightness sensor 78 are provided below the front surface portion of the display panel 90. The operating unit 71 is a touch type key module. The light-receiving unit 73 receives operation information supplied from the remote controller 72. The brightness sensor 78 detects brightness information of the surrounding of the display panel 90.

FIG. 4A to FIG. 4D are views each showing the configuration of the operating unit 71 of the image displaying apparatus of this embodiment.

FIG. 4A shows the key arrangement. On the operating unit 71, an INPUT key 71a, MENU key 71b, Vol DOWN key 71c, Vol UP key 71d, CH DOWN key 71e, CH UP key 71f and POWER key 71g are provided. The keys are configured as a pointing device and whether or not one of the keys is operated is determined by touching the key surface.

Further, as shown in FIG. 4B, LEDs 20a, 20b that illuminate the keys 71a to 71f and a light-guide plate 21 are arranged on the back of the keys 71a to 71f. Further, an LED 20c that illuminates the key 71g and a light-guide plate 22 are arranged on the back of the key 71g. The keys 71a to 71f are simultaneously illuminated by means of the light-guide plate 21 and the LEDs 20a, 20b provided on both sides thereof. The reason why the LEDs 20a, 20b are provided on both sides of the light-guide plate is to uniformly illuminate a plurality of keys 71a to 71f. Further, the POWER key 71g is illuminated by means of the light-guide plate 22 and the LED 22c that is provided on one end thereof. Therefore, an area (range) in which the light-guide plates 21, 22 are arranged is a light-emission range.

Further, as shown in FIG. 4C, the whole portion of the keys 71a to 71g may be covered with a light-guide plate 23 and LEDs 20a, 20b, 20c (not shown) that are light-shielded in an area other than the light-emission range shown in FIG. 4B.

In FIG. 4D, a light-shielding tape that is provided on the peripheries of the keys to prevent the light leakage is shown. The light leakage can be prevented and the respective operation functions can be separated by means of the light-shielding tape and the operation can be easily performed.

The operating unit 71 with the above configuration can be understood to include keys of two groups. The first group includes at least one key as indicated by a plurality of keys 71a to 71f simultaneously illuminated by use of one light source. The second group includes at least one key as indicated by the key 71g illuminated by means of a light source independently provided. The operations of the keys of the first and second groups when they are performed (touched) are different from each other. Further, the configuration may be made to respectively provide LEDs 26a to 26f on the back of the keys 71a to 71f and individually illuminate the respective keys.

FIG. 5A, FIG. 5B are views for illustrating the operation of the keys of the first group of the image displaying apparatus of this embodiment.

When the user first touches the key of the first group of the operating unit 71, all of the keys are first lighted as shown in FIG. 5A and the real operation corresponding to the pressed key is not performed. If the user next touches the key, the assigned operation is performed. That is, the operating unit 71 starts a desired operation by a two-step operation. In this case, as shown in FIG. 5B, a design can be made to light only the key if the user touches the key in the second step.

Even in an environment in which the surrounding of the display panel 90 is dark and the user cannot recognize the respective keys of the first group of the operating unit 71, the user can correctly recognize a desired key, an erroneous operation can be prevented and the operability can be enhanced by lighting all of the keys by the first touch operation. Further, since it is unnecessary to always light the LEDs, wasteful power loss can be reduced.

Figure 6:
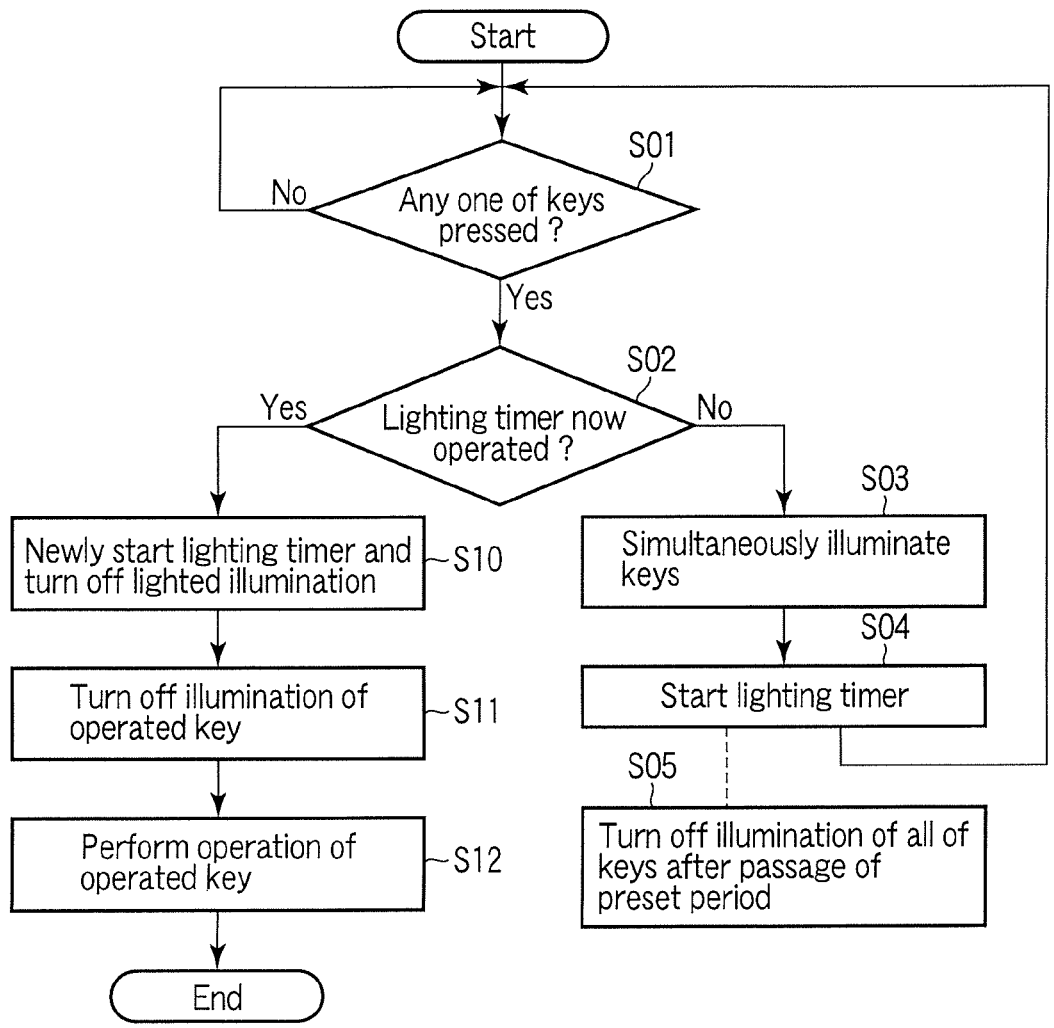
FIG. 6 is a diagram for illustrating the operation of the keys of the first group of an exemplary image displaying apparatus of the embodiment.

FIG. 6 is a flowchart for illustrating the operation of the keys of the first group in the image displaying apparatus of this embodiment.

The operating unit 71 monitors in S01 whether or not one of the keys except the POWER key 71g belonging to the second group is pressed. When one of the keys is pressed (S01, Yes), it checks whether a lighting timer (that will be described later) is now operated or not in S02. If the lighting timer is not being operated (S02, No), the LEDs 20a, 20b arranged on both ends of the keys 71a to 71f are lighted in S03 to simultaneously illuminate the keys 71a to 71f. In S04, the operating unit 71 starts the lighting timer and the process returns to S01 to wait for a next operation.

If the lighting timer is timed up, the LEDs 20a, 20b are turned off.

If the lighting timer is being operated (S02, Yes), the operating unit 71 newly starts the lighting timer and turns off the lighted LEDs in S10. If the preceding key operation is the first key operation, the LEDs 20a, 20b are turned off. If the preceding key operation is the second or succeeding key operation, the LED corresponding to the key lighted in the preceding cycle is turned off. In S11, the operating unit 71 turns on the LED corresponding to the pressed key to light only the key. Then, in S12, the operating unit 71 outputs information that specifies the pressed key to the controller 61 that in turn performs the operation of the pressed key.

If the LEDs are not provided individually for the keys in the first group, only the turn-on/off operation of the simultaneous illuminating LEDs 20a, 20b is controlled.

Next, the operation of the keys of the second group of the image displaying apparatus of this embodiment is explained. It is preferable that the LEDs corresponding to the individual keys be kept lighted in a preset state in the second group. The preset state in this embodiment indicates, for example, a standby state or operative state of the image displaying apparatus, and indicates the following state, for example. That is, if the power source key 17a of the remote controller 72 is pressed in a state in which the power source of the image displaying apparatus is on, image display and audio output are stopped and the color of the LED is changed from green to red, yellow or the like and a state (standby state) in which only a part of the internal circuit is operated is set. Further, the operative state indicates a state in which an image and audio are output while the power source of the image displaying apparatus is on. Then, if one of the keys belonging to the second group is pressed in the above state, the controller 61 performs the operation corresponding to the pressed key by the above one operation.

The key of the second group is placed in a state in which the key operation is performed by one operation in the preset state (the standby state or operative state of the image displaying apparatus in this embodiment). That is, the state can be considered to be a state in which the first touch operation in the first group has already been performed. The reason why the above function is given to the second group is explained by taking a case wherein the key of the second group is a "Power" key as an example.

As described above, the user can detect the position of the TV set in which the POWER key is located at the first glance when the user does not have the remote controller and tries to turn on the power source of the television in a dark room, for example, by illuminating the key itself in the standby state (including the state in which image display and audio output are stopped by pressing the key of the second group: POWER key while the power source of the image displaying apparatus is on) or operative state.

Thus, user friendly operation means can be provided by separating the contents of the key operation into items that are made useful by the operation of the first group and items that are made responsive by the operation of the second group. In this case, the turn-on color may be changed before the operation of the key of the second group and at the operation time. For example, the user can more correctly recognize that the operation is performed by turning on the LED 20c in red before the operation and turning on the LED 20d in green or blue at the operation time. That is, the key of the second group is not lighted while the main power source of the image displaying apparatus is off, and the key is lighted in red in the standby state and lighted in green or blue in the operative state after the operation. By taking the convenience of the user into consideration, it is preferable to make the lighting colors of the key of the second group different according to the state of the image displaying apparatus.

The operation of (simultaneously or individually) lighting on/off the key may be controlled by means of the operating unit 71 or controller 61.

Next, the OSD display operation of the digital television broadcast receiving apparatus 41 including the operating unit 71 is explained.

Figure 7:
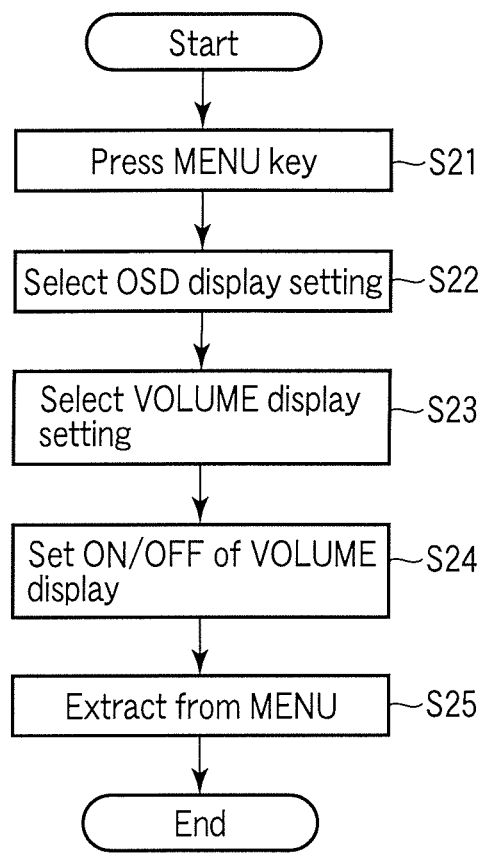
FIG. 7 is a flowchart showing the procedure of setting on/off of OSD display of an exemplary image displaying apparatus of the embodiment.

FIG. 7 is a flowchart showing the procedure of setting on/off of the OSD display of the image displaying apparatus of this embodiment.

When the OSD display on/off state is set on the digital television broadcast receiving apparatus 41, the user presses the menu key 17p of the remote controller 72 in S21. Then, the user selects OSD display setting on a menu screen (not shown) displayed in S22.

Figure 8:
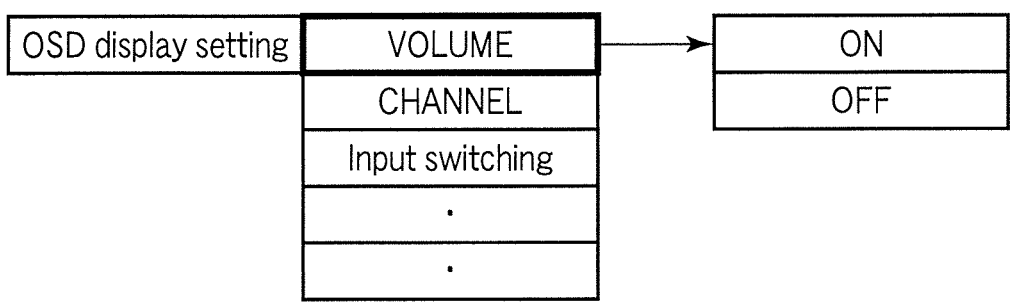
FIG. 8 is a diagram showing the display hierarchy of OSD display setting of an exemplary image displaying apparatus of the embodiment.

FIG. 8 is a diagram showing the display hierarchy of OSD display setting of the image displaying apparatus of this embodiment.

If OSD display setting is selected, a plurality of items that become objects of OSD display setting are displayed. In the items, for example, volume adjustment (VOLUME), channel selection (CHANNEL), input switching and the like are included. If the item that becomes the object of OSD display setting is selected, setting that indicates whether or not the item is OSD-displayed can be input. For example, if the OSD display of the volume is not made, the input is set by sequentially selecting (clicking) the items in an order of OSD display setting→Volume→Off. The other functions can be set in the same manner as for the above function.

In S23, S24, of FIG. 7, the user selects volume and sets on/off of OSD display for volume. Then, if the user presses the menu key 17p of the remote controller 72 again in S25, the menu screen display is terminated.

The user may press the menu key 71b of the operating unit 71 instead of the menu key 17p of the remote controller 72.

Figure 9:
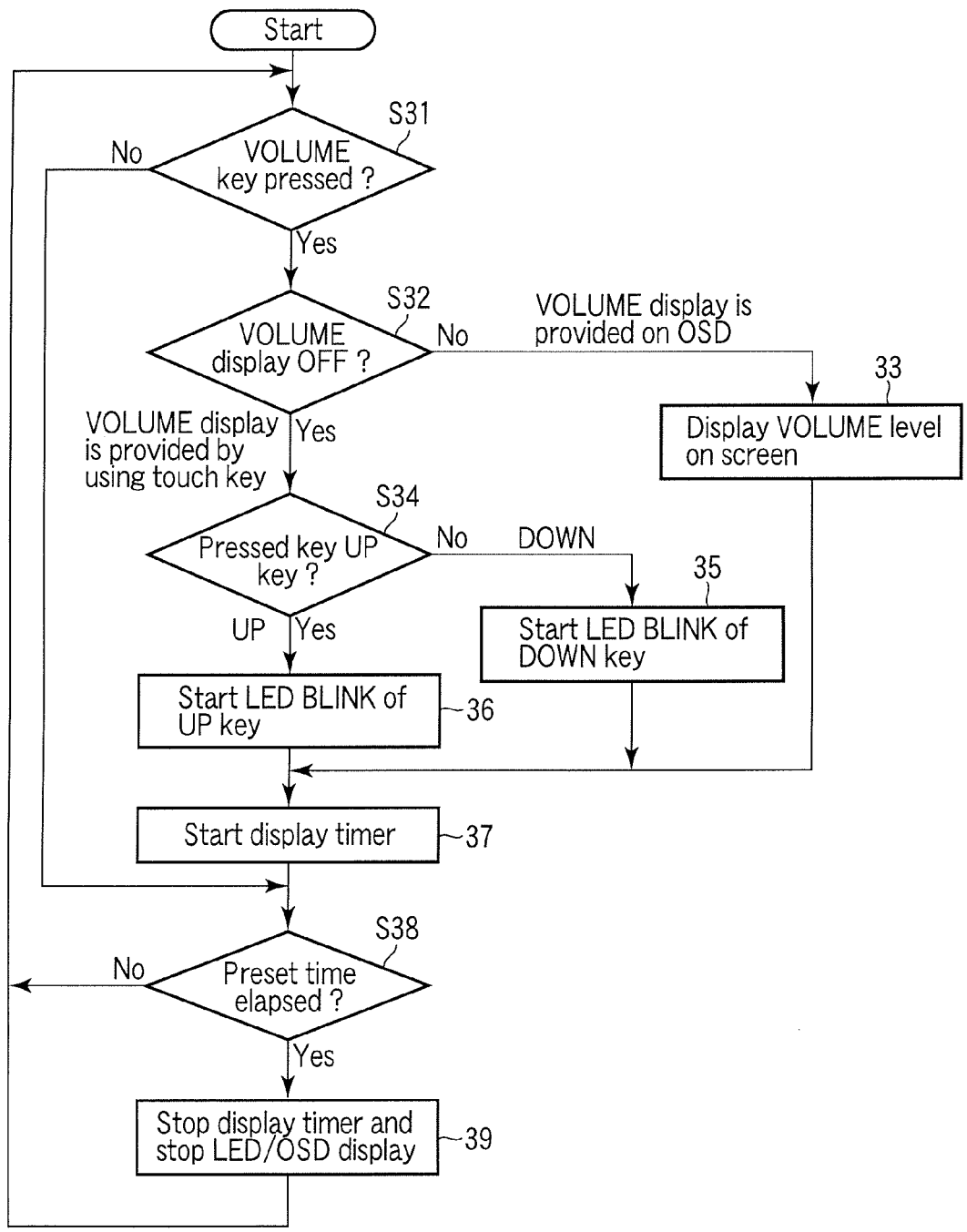
FIG. 9 is a flowchart showing the operation when volume of an exemplary image displaying apparatus of the embodiment is adjusted.

FIG. 9 is a flowchart showing the operation when volume of the image displaying apparatus of this embodiment is adjusted. The operation is performed by means of the controller 61.

In S31, the controller 61 determines whether the volume key is pressed or not. That is, when the volume key 17o of the remote controller 72 is operated, the controller 61 acquires the operation content via the light-receiving unit 73. When the Vol DOWN key 71o or Vol UP key 71d of the operating unit 71 is operated, the controller 61 acquires the operation content via the operating unit 71.

Figure 10A:
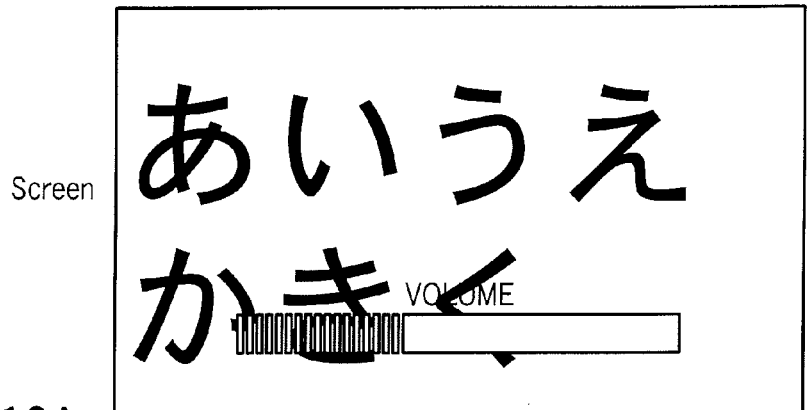
Figure 10B:
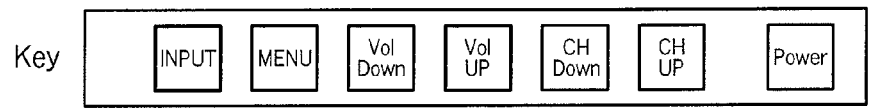

When the volume key is pressed (S31, Yes), the controller 61 checks in S32 whether setting of the OSD display for volume is on or off. When setting of the OSD display is on (S32, No), the graphic processor 52 displays a volume level on the display screen in S33. FIG. 10A, FIG. 10B are views for illustrating a volume display method when the OSD display of the image displaying apparatus of this embodiment is on. On the display screen shown in FIG. 10A, a volume level is OSD-displayed. At this time, as shown in FIG. 10B, no particular display is made for the keys of the operating unit 71.

When setting of the OSD display is off (S32, Yes), the controller 61 checks in S33 whether the pressed key is a VOLUME UP (+) key or DOWN (−) key. If the pressed key is the VOLUME DOWN (−) key (S34, No), the controller 61 turns down the volume and causes the LED of the Vol DOWN key 71*c* of the operating unit 71 to blink (flicker) in S35. If the pressed key is the VOLUME UP (+) key (S34, Yes), the controller 61 turns up the volume and causes the LED of the Vol UP key 71*d* of the operating unit 71 to blink (flicker) in S36.

Figure 11A:
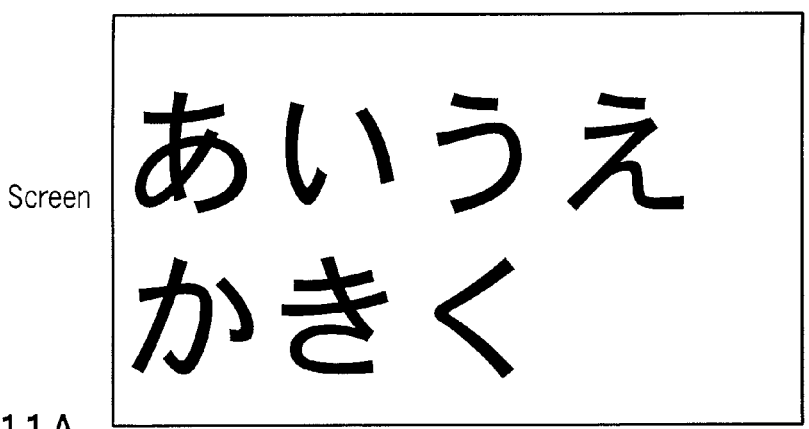
FIG. 11A, FIG. 11B are views for illustrating a volume display method when OSD display of an exemplary image displaying apparatus of the embodiment is off.
Figure 11B:
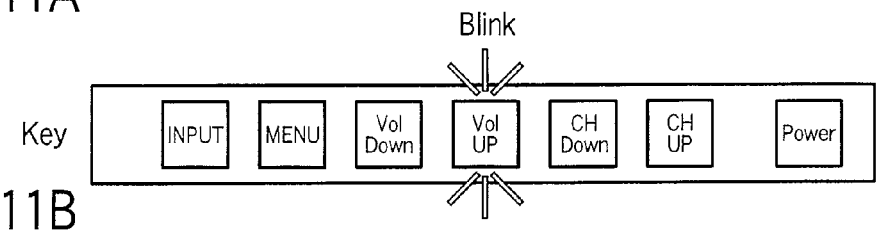

FIG. 11A, FIG. 11B are views showing a volume display method when the OSD display of the image displaying apparatus of this embodiment is off. On the display screen shown in FIG. 11A, no OSD display is made. As shown in FIG. 11B, when the VOLUME UP (+) key is operated, the Vol UP key 71*d* of the operating unit 71 blinks. Further, when the VOLUME DOWN (−) key is operated, the Vol DOWN key 71*c* of the operating unit 71 blinks.

In S37 of FIG. 9, the operation of the display timer is started after an OSD display or key-blinking operation is started. Then, the OSD display or key-blinking operation continues until a preset time elapses, the operation of the display timer is stopped and the OSD display or key-blinking operation is stopped in S39 after the preset time has elapsed.

As described above, when the operation is performed for the item in which the OSD display is off, the key of the operating unit 71 corresponding to the operated item is blinked. Therefore, the user can instantly understand that setting of the OSD display is off and the operation is performed effectively.

The operation for the items other than volume, that is, channel selection, input switching or the like is performed in the same manner.

Variation of First Embodiment

In the variation of the first embodiment, the operation of the operating unit 71 when the operation for the item in which the OSD display is off is different.

Figure 12A:
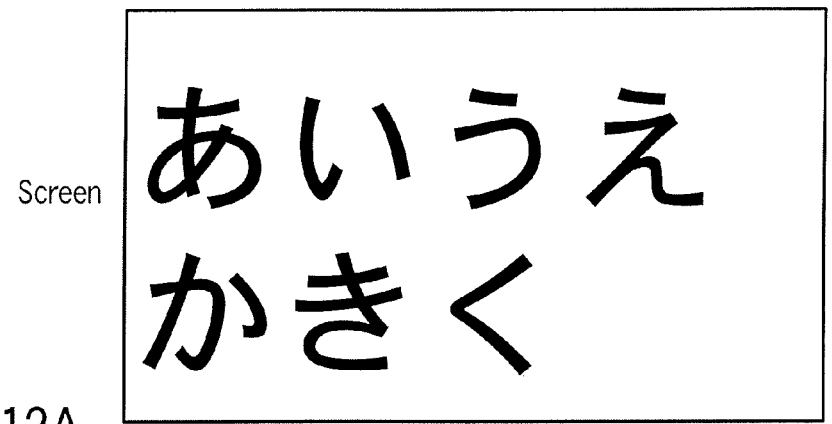
FIG. 12A, FIG. 12B are views for illustrating a volume display method when OSD display of an exemplary image displaying apparatus of a variation embodiment is off.
Figure 12B:
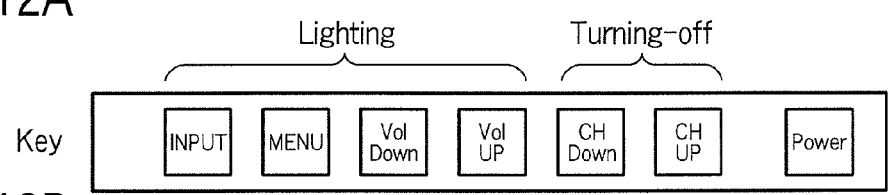

FIG. 12A, FIG. 12B are views for illustrating a volume display method when the OSD display of the variation of the embodiment is off. On the display screen shown in FIG. 12A, no OSD display is made. As shown in FIG. 12B, when the VOLUME UP (+) key is operated, the LEDs corresponding to the keys other than the POWER key 17*g* are sequentially turned on from the left and when the VOLUME DOWN (−) key is operated, the LEDs are sequentially turned off from the right. That is, the volume level that is OSD-displayed is represented by the lighting state of the keys of the operating unit 71. Therefore, the present volume level can be roughly ascertained in an embodiment similar to the conventional OSD display.

Figure 13A:
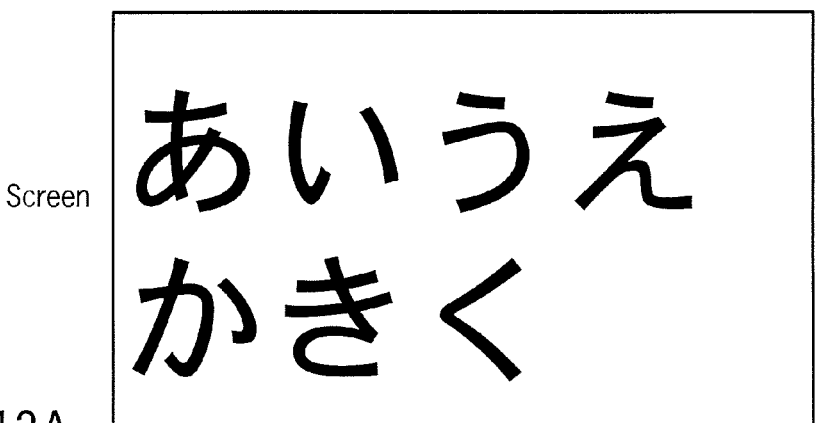
FIG. 13A, FIG. 13B are views for illustrating a mute display method when OSD display of an exemplary image displaying apparatus of a variation embodiment is off.
Figure 13B:
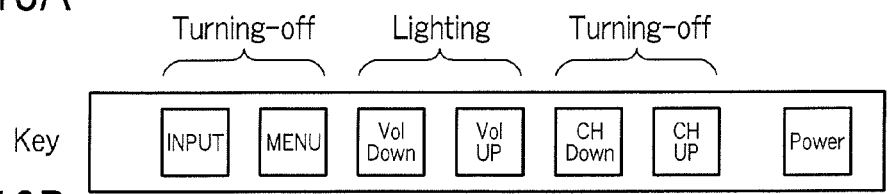

In the case of audio, a mute function is provided and the mute function can be displayed by similarly using the Vol DOWN key 71*c* and Vol UP key 71*d* of the operating unit 71. For example, as shown in FIG. 13A, FIG. 13B, the mute state is indicated by simultaneously lighting the two keys. Further, if an emitted-light color indicating the mute state is set to a color different from an emitted-light color indicating the non-mute state, the user can more clearly recognize the mute state. An audio mute may be dealt with in correspondence to OSD display setting of the audio volume or individually provided on the setting item of the OSD display.

[Effect]

Various effects can be attained according to the embodiments described above.

The operating unit 71 starts a desired operation by two-step operations. Even in an environment in which the surrounding of the display panel 90 is dark and the user cannot recognize the keys of the operating unit 71, the user can recognizes a desired key without fail, an erroneous operation can be prevented and the operability can be enhanced by lighting all of the keys by the first touch operation. Further, since it is unnecessary to always light the LEDs, wasteful power loss can be reduced.

When the OSD display is turned off, the lighting display state of each key of the operating unit 71 is used instead thereof. Therefore, an image scene or information displayed on the screen can be prevented from being concealed without losing the convenience of the OSD display.

For example, when the operation is performed for the item in which the OSD display is set off, the key of the operating unit 71 corresponding to the operated item is blinked. As a result, the user can instantly understand that setting of the OSD display is off and the operation is effectively performed.

Further, the volume level that is OSD-displayed is represented by the lighting state of the keys of the operating unit 71. Therefore, the present volume level can be roughly ascertained in an embodiment similar to the conventional OSD display.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image displaying apparatus comprising:
a display unit;
a touch type operating unit comprising a first group of at least one touch key and a second group of at least one touch key for performing various operations of the image displaying apparatus;
a setting unit configured to set whether an on-screen display (OSD) is produced on the display unit for each operation item;
first and second groups of light sources provided in the operating unit to respectively illuminate the first and second groups of touch keys; and
a turn-on/off controller configured to control a turn-on/off state of the first group of light sources instead of the OSD when an operation is performed for an operation item that is not set to produce the OSD,
wherein the image displaying apparatus controls the turn-on/off state of at least one of the first group of light sources or the second group of light sources in accordance with a touch operation of touch keys, and executes a preset operation of the image displaying apparatus in accordance with the touch operations of the touch keys, wherein the second group of touch keys relates to a power source operation, and the first group of touch keys relates to an operation other than the power source operation, and wherein the first group of touch keys includes two touch keys used to perform audio volume up and down operations, the first group of light sources further comprises other light sources of a different display color configured to respectively illuminate the two touch keys, and the turn-on/off controller controls the turn-on/off state of the other light sources when the item that is set not to display the OSD is one of audio volume and audio mute items and the operation is performed for the audio mute item.

2. An image displaying apparatus comprising:

a display unit;

a touch type operating unit comprising a first group of touch keys including at least one touch key, a first light source to illuminate the first group of touch keys, a second group of touch keys including at least one touch key, and a second light source to illuminate the second group of touch keys, wherein the second group of touch keys relates to a power source operation, and the first group of touch keys relates to an operation other than the power source operation and includes a plurality of touch keys to increase and decrease the audio volume, the first light source further comprises one or more light sources of a different display color configured to respectively illuminate the plurality of touch keys;

a setting unit configured to set an activation state or a deactivation state of an on-screen display (OSD), wherein when the OSD is activated, the OSD is produced on the display unit for each operation item when an operation is performed, and wherein when the OSD is deactivated, the OSD is not produced on the display unit for each operation item when an operation is performed; and an activation controller configured to set an activation state or a deactivation state of the first light source and the second light source, the first light source being activated when the OSD is deactivated and the first light source being deactivated when the OSD is activated, wherein the image displaying apparatus controls the activation state of at least one of the first light source or the second light source in accordance with a touch operation of touch keys, and executes a preset operation of the image displaying apparatus in accordance with the touch operations of the touch keys, and the activation controller controls the activation state of the one or more light sources of the first light source when the operation item having the OSD deactivated is one of audio volume or audio mute items and the operation is performed for the audio mute item.

3. The image displaying apparatus of claim 1, wherein the operation item comprises one of volume adjustment, channel selection or input switching.

4. The image displaying apparatus of claim 2, wherein the operation item comprises one of volume adjustment, channel selection or input switching.

* * * * *